Feb. 5, 1946.   A. ALLEN   2,393,960
RECORDING MECHANISM
Filed May 7, 1943
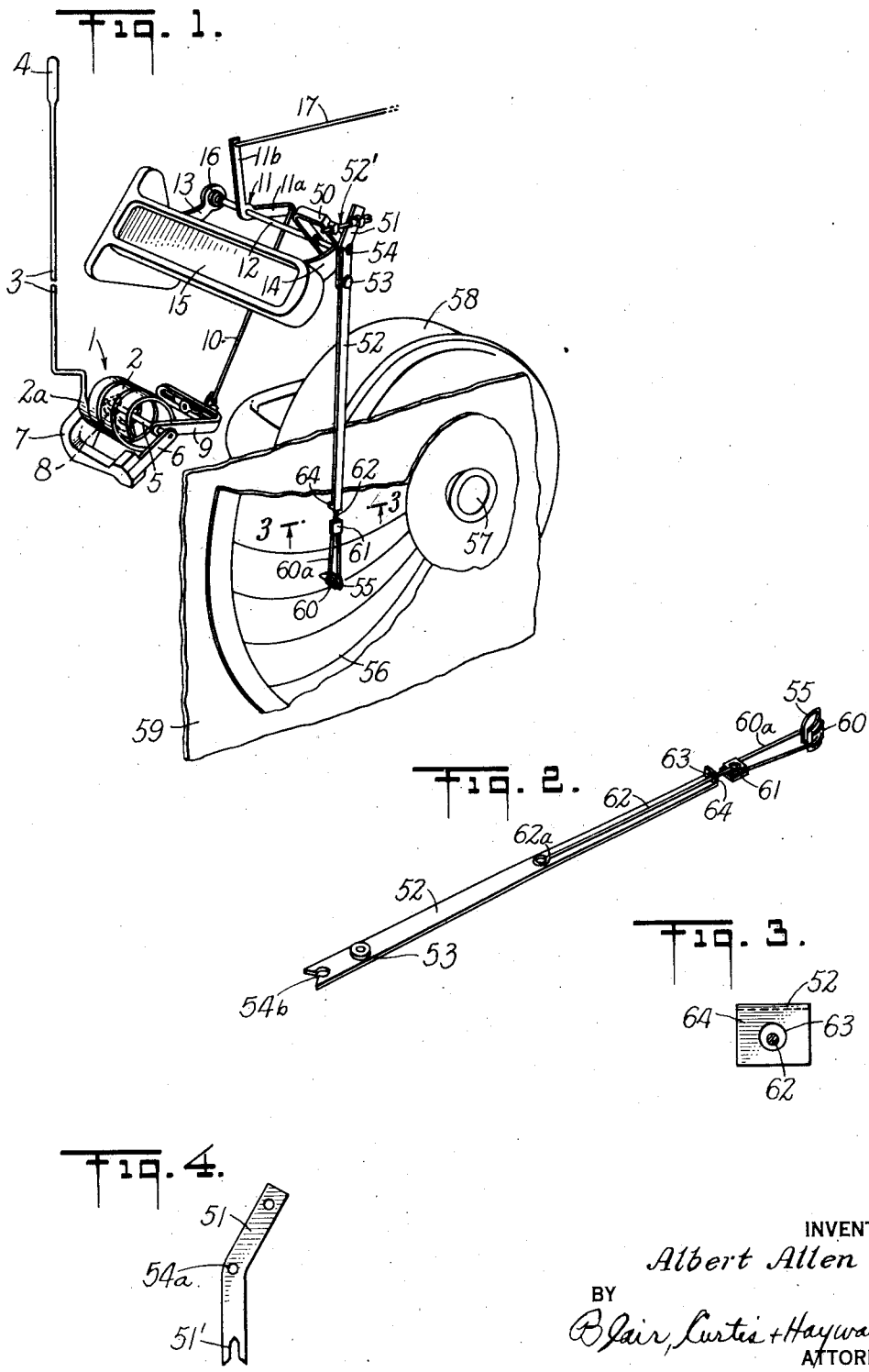
INVENTOR
Albert Allen
BY
Blair, Curtis + Hayward
ATTORNEYS Patented Feb. 5, 1946

2,393,960

UNITED STATES PATENT OFFICE 2,393,960

RECORDING MECHANISM

Albert Allen, Sharon, Mass., assignor to The Foxboro Company, Foxboro, Mass., a corporation of Massachusetts Application May 7, 1943, Serial No. 486,075

4 Claims. (Cl. 234—72)

This invention pertains to apparatus for recording and controlling the value of a condition of an industrial process, as for example recording and controlling the temperature of a process by regulating fuel flow affecting the temperature. In particular, the invention relates to improved apparatus for combining with a highly responsive controller, recording mechanism for recording the value of the condition being controlled by the controller without interfering with the operation of the controller in controlling the process.

An object of the invention is to provide novel apparatus for recording the value of a condition being controlled where both the recording and controlling instrumentalities are made responsive to the same measuring element.

Other objects will be in part obvious, and in part pointed out hereinafter.

In the drawing:

Figure 1 is a perspective view of a recorder embodying the present invention adapted for use with a controller not shown;

Figure 2 is a detailed view of a flexible link connecting a pen and pen arm;

Figure 3 is a section taken on line 3—3 of Figure 1; and

Figure 4 is an enlarged view of a pen arm support shown in Figure 1.

Automatic controllers for controlling industrial processes operate in response to changes in the value of a condition of a process being controlled to manipulate a variable which affects the condition being controlled. For example, if the condition of the process to be controlled is its temperature, then the controller in response to the changes in the temperature will manipulate some variable, such as flow of fuel, to maintain the temperature at the desired value. Present day controllers are called upon to control many kinds of processes which are inherently very difficult to control because of the presence of so-called "process lags." Such lags retard the process in responding to changes in the manipulated variable, and unless the controller is made highly responsive to the slightest change in the condition being controlled, and is able to convert such small changes into suitably proportioned control effects, then the controller may be unsatisfactory in its control performance and cause the process to cycle badly or permit it to depart undesirably from the manner in which it is intended to operate.

Controllers are provided with a so-called "measuring element" which moves in response to changes in the value of the condition being controlled. This measuring element must be made highly responsive to changes in the value of the condition in order for the controller to perform satisfactorily. If the controller is controlling a temperature condition, the measuring element must be made to move proportionately to even the slightest changes of the temperature in order that the controller may itself be responsive to the slightest changes in temperature and make properly proportioned control effects in response thereto. It is desirable in many instances to combine a recording mechanism with the controlling mechanism so as to record on a moving chart the value of the condition being controlled—and to use the same measuring element to drive the pen of the recording apparatus as is used to transmit the changing values of the controlled condition to the controller. Where the recording is performed by a pen which is caused by the measuring element to traverse a chart surface moving under the pen, the friction between the pen and the chart may be sufficient to hold back the measuring element from moving in response to slight changes in the condition being controlled and recorded, and so prevent the measuring element from transmitting to the controller such slight changes. Such an arrangement, particularly when the controller is applied to the control of processes that are inherently difficult to control, may interfere with the best operation of the controller.

In the present invention, provision is made in a recorder for the measuring element to transmit to the controller even the slightest changes in the condition being measured without interference from the pen friction on the chart, while at the same time provision is made for obtaining a satisfactory record of the condition being controlled.

Referring to Figure 1, there is shown a recorder of a type particularly adapted to respond to even slight changes in a condition of a process being controlled, and to translate such slight changes into a valve action regulating flow affecting the condition. Referring to Fig. 1 of the drawing, there is shown, generally indicated at 1, a measuring element including a hollow helical tube 2, the interior of which is connected by a tube 3 to a thermometer bulb 4, adapted to be exposed to a temperature to be controlled. The bulb 4, tube 3, and the hollow helix 2, are filled with a suitable fluid that increases the pressure in the hollow tube 2 as the temperature of the bulb increases, and decreases the pressure in the hollow tube 2 as the temperature of the bulb 4 decreases.

The hollow tube is fixed at its inner end 2a, but its outer end is left free so that as the pressure within the helix increases or decreases, the helix unwinds and winds, thereby moving the free end in a clockwise or counter-clockwise direction. Mounted within the helix and coinciding with the axis thereof, is a shaft 5, supported between supports 6 and 7, so that the shaft is free to turn with a minimum of frictional resistance. The free end of the helix is mechanically connected by a suitable metal strip 8 (shown in dotted lines in the drawing) to the shaft 5, so that as the free end of the helix moves, the shaft 5 moves in correspondence.

Fixed to the shaft 5 is an arm 9, which arm is connected by means of a link 10 to a crank, generally indicated at 11. The crank 11 is mounted on a shaft 12, mounted between supports 13 and 14 extending from a main support 15 mounted on the base of the instrument. This shaft is mounted in jewel bearings 16 so that it moves with a minimum of frictional resistance. A bearing similar to the jewel bearing 16 supports the forward end of the shaft 12 from the support 14.

As shown in Figure 1, the link 10 is mechanically connected to an arm 11a of the crank. The connections between the link 10 and the arm 9, and the arm 11a, are loose so that pivoting of the arms 9 and 11a is not bound or interfered with by the movement between the link 10 and the respective arms. The looseness of the connections is at all times taken up by a slight clockwise movement that is imparted to the crank 11 by the mechanism of the controller (not shown).

With this mechanical construction the crank 11 is caused to move in accordance with the slightest movement of the free end of the helix 2 without offering resistance to its movement. Consequently, the crank 11 is caused to move in accordance with the slightest changes in the temperature in the bulb 4.

Referring still to Figure 1, the motion of the crank 11 is transmitted by its arm 11b to a link 17. The link 17 goes to an automatic controller to operate that part of the controller which is responsive to the positional movements of the measuring element 1. Such a controller offers no resistance to movement of the link 17 and so no resistance to movement of the measuring element 1. A controller to which the link 17 might be connected is shown in Patent No. 2,360,889 issued to George K. Philbrick October, 1944. In such a controller, the slightest movements of the measuring element are transmitted through the link 17 resulting in accurately proportioned control operations.

Condition-responsive elements, such as the hollow helix shown at numeral 1, are capable of exerting only relatively small forces when moving in response to pressure changes in them; nevertheless, by reason of the construction of the control instrument, the force that the element can exert, even for small movements due to slight changes in the value of the process condition to be controlled, is high as compared with the force required to move the arc lever and connecting links of the controller. Consequently, the controller may be made highly responsive to even slight changes in the value of the condition being controlled.

Turning now to a consideration of the recording part of the controller and to the central portion of Figure 1, to the shaft 12 is fixed a U-shaped arm 50. The U-shaped arm 50 is bent to have a portion extending radially from the shaft 12, an adjoining portion that extends forwardly parallel to shaft 12, and finally a portion that extends to the axis of shaft 12 but passes in front of the shaft. A pen arm support 51 is pivotally fixed to this forward end of the U-shaped arm 50, the pivot point 54a being coincident with the axis of shaft 12. A micrometer screw mechanism generally indicated at 52' serves adjustably to fix the angular relationship between the arm 50 and the pen arm support 51. The pen arm support 51 carries the downwardly extending pen arm 52 detachably secured to the support by pin 53 fixed to the pen arm 52 and engageable in a slot 51' (Figure 4) provided in the pen arm support 51. A pin 54 fixed to the pen arm support 51 engages a notch 54b in the upper end of the pen arm 52. This construction provides for movement of the pen arm 52 by the shaft 12, and the measuring element 1.

Referring to Figures 1, 2, and 3, the pen arm 52 carries a pen 55 and causes it to traverse a rotating chart 56, supported on a clock hub 57 of a clock 58. A chart backing plate 59 serves to back up the chart 56. Referring to Figure 3, the pen 55 is held in a V-shaped holder 60 which, in turn, is rigidly attached to a small plate 61 by means of wire members 60a. To the small plate 61 is fixed a resilient connecting link 62 which extends through a hole 63 of the turned-up end 64 of the pen arm 52. The resilient connecting link 62 is fixed at its end 62a to the pen arm 52 as by soldering or some other suitable rigid connection.

The hole 63 through which the resilient connecting link 62 extends is larger in diameter than the link 62, so that although the link 62 normally assumes a definite mid-position in the hole 63 and so supports the pen 55 in a definite relationship with respect to the pen arm 52, the hole permits movement of the link 62 and so movement of the pen 55 with respect to the pen arm 52 when the pen arm 52 moves transversely of the chart and drags pen 55 over the chart.

Referring again to Figure 1, with this construction small movements of the shaft 12 by the measuring element 1 are not held back by the pen-chart friction. If the pen is held from moving by such friction, the wire link 62 bends to permit the arm 52 to move, and so to permit shaft 12 and the controller parts to move in response to slight movement of the measuring element 1.

The wire link connection 62 is made sufficiently long to permit the necessary relative movement between the pen and pen arm 52 to eliminate the effect of the friction between the pen and the chart on the control operation. But, at the same time, its resiliency is such that, as the chart turns, the pen will be moved back to its correct relationship with respect to the pen arm to provide a sufficiently accurate record of the condition being measured by the measuring element 1. Also, the relative dimensions of the hole 63 and the wire link 62 are such as to prevent excessive relative movement between the pen and the pen arm.

One of the advantages of the present invention in eliminating any effect of the pen-chart friction on the control effect of the controller is that a pen and pen arm embodying the present invention may be conveniently and simply attached to recorder controllers already in service and so improve their control operation by eliminating the effects of the pen-chart friction.

As many possible embodiments may be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. For use in a recording controller having control mechanism, recording mechanism, and a measuring element movable in proportional response to changes in the value of a condition being controlled to operate said control mechanism and to operate said recording mechanism to make on a chart a record of the condition, said recording mechanism including movable means movable by and in correspondence with the movement of said measuring element; a pen arm supported from and movable by said movable means, a pen adapted to draw a record on said chart, a resilient yieldable supporting link fixed at one end to said pen arm and carrying said pen at its other end, whereby said link is yieldable to permit said measuring element to impart slight movement to said movable means even though said pen is held from movement by the friction between said pen and said chart.

2. For use in a recording controller having control mechanism, recording mechanism, and a measuring element movable in proportional response to changes in the value of a condition being controlled to operate said control mechanism and to operate said recording mechanism to make on a chart a record of the condition, said recording mechanism including movable means movable by and in correspondence with the movement of said measuring element; a pen arm supported from and movable by said movable means, a pen adapted to draw a record on said chart, a resilient yieldable supporting link fixed at one end to said pen arm and carrying said pen at its other end, whereby said link is yieldable to permit said measuring element to impart slight movement to said movable means even though said pen is held from movement by the friction between said pen and said chart, and said pen arm being provided with means for limiting the movement permitted by said resilient supporting link between said pen and pen arm.

3. For use in a recording controller having control mechanism, recording mechanism, and a measuring element movable in proportional response to changes in the value of a condition being controlled to operate said control mechanism and to operate said recording mechanism to make on a chart a record of the condition, said recording mechanism including movable means movable by and in correspondence with the movement of said measuring element; a pen arm supported from and movable by said movable means, a pen adapted to draw a record on said chart, a resilient yieldable supporting link fixed at one end to said pen arm and carrying said pen at its other end, whereby said link is yieldable to permit said measuring element to impart slight movement to said movable means even though said pen is held from movement by the friction between said pen and said chart, and said pen arm being provided with a lip having a hole therethrough through which said resilient supporting link extends, and the walls of said hole being spaced from and permitting lateral limited movement of the resilient link therein.

4. For use in a recording controller having control mechanism, recording mechanism, and a measuring element movable in proportional response to changes in the value of a condition being controlled to operate said control mechanism and to operate said recording mechanism to make on a chart a record of the condition, said recording mechanism including movable means movable by and in correspondence with the movement of said measuring element; a pen arm detachably supported by and depending from said shaft, and a wire link fixed to said pen arm at a point spaced from its supporting end and extending parallel to said pen arm and beyond the free end thereof, a pen carried by the free end of said wire link in contact with said chart, whereby relative movement is permitted between said pen and pen arm, and said pen arm having stop means for limiting the relative movement between said wire link and said pen arm.

ALBERT ALLEN.